No. 681,594. Patented Aug. 27, 1901.
D. K. UDALL.
AGRICULTURAL MACHINE.
(Application filed Oct. 25, 1900.)
(No Model.) 2 Sheets—Sheet 1.
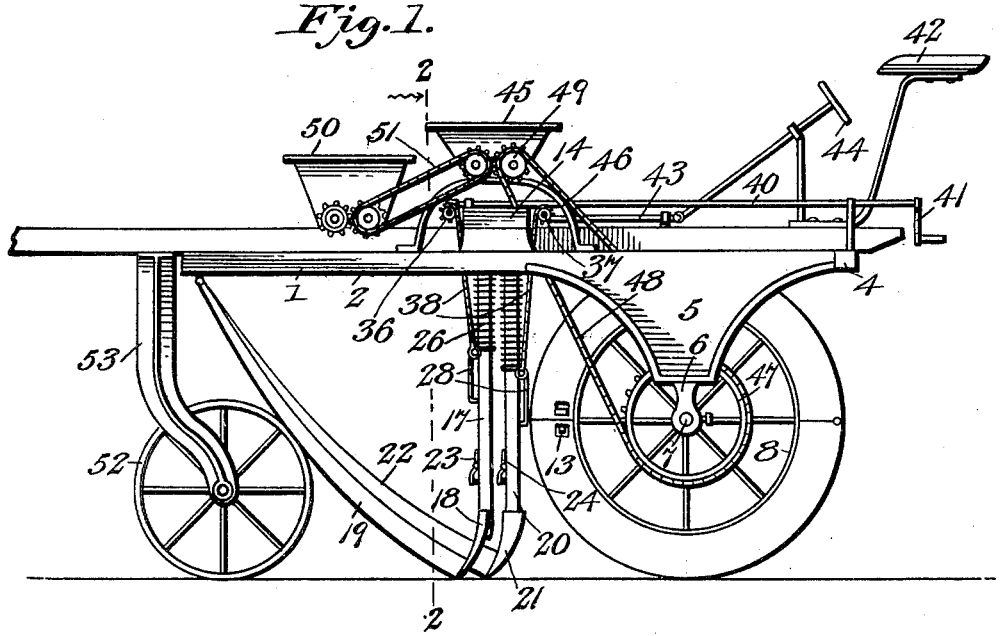
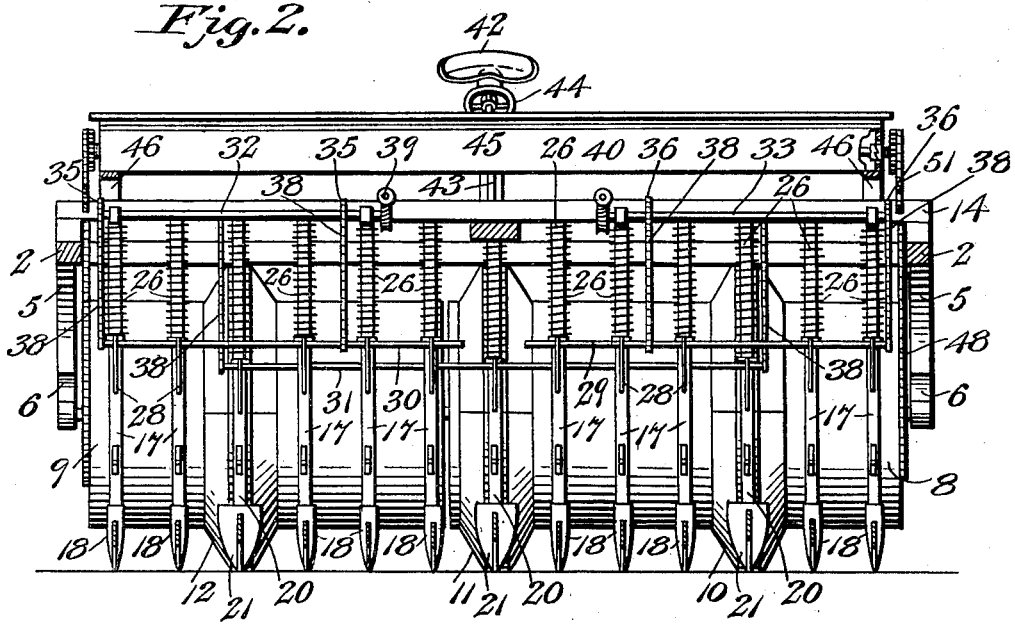
David K. Udall Inventor
Witnesses

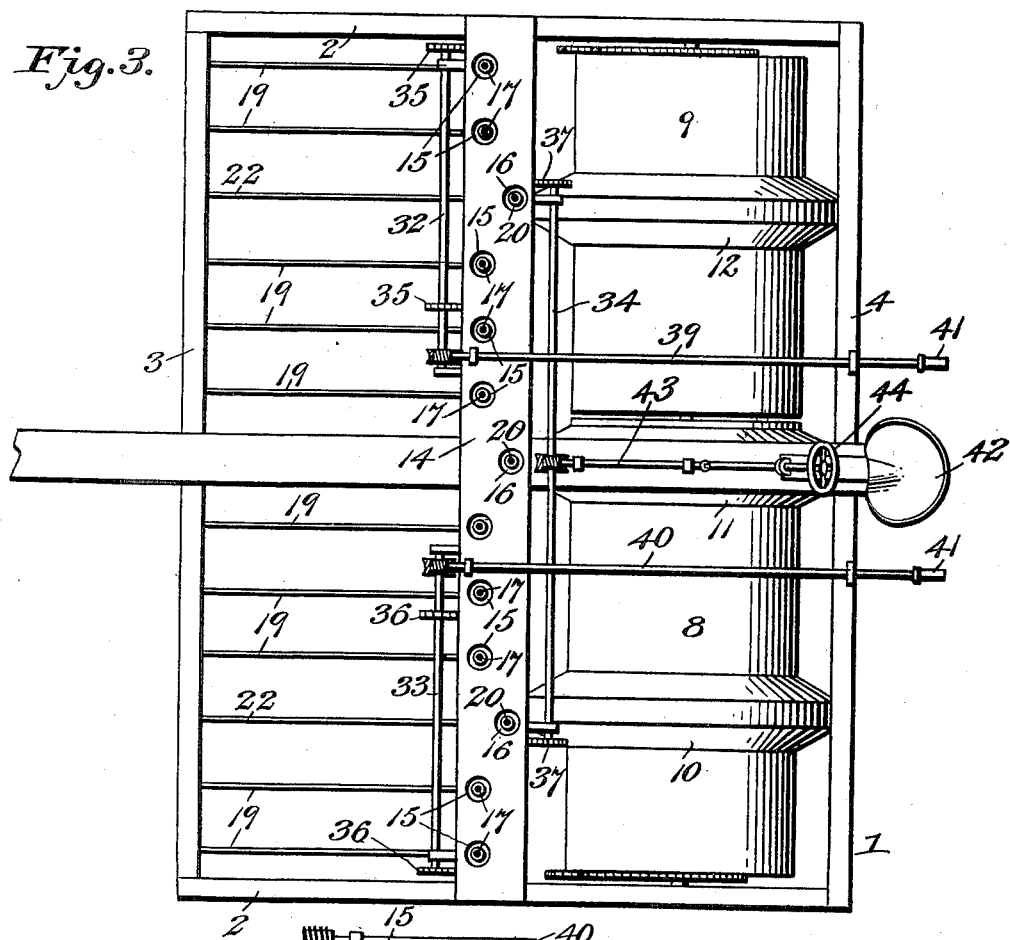

UNITED STATES PATENT OFFICE.

DAVID KING UDALL, OF ST. JOHNS, ARIZONA TERRITORY.

AGRICULTURAL MACHINE.

SPECIFICATION forming part of Letters Patent No. 681,594, dated August 27, 1901.

Application filed October 25, 1900. Serial No. 34,374. (No model.)

*To all whom it may concern:*

Be it known that I, DAVID KING UDALL, a citizen of the United States, residing at St. Johns, in the county of Apache and Territory of Arizona, have invented a new and useful Agricultural Machine, of which the following is a specification.

My invention relates to a novel agricultural machine embodying in combination a roller, marker, and seeder.

The object of the invention is to produce a machine of this character by the use of which the grain or seeds can be planted either by drilling or broadcasting, as desired, and the soil marked in furrows and rolled during the planting operation.

A still further object of the invention is to provide for the distribution of chemical or other fertilizers over the ground immediately in advance of the drills, so that by a single operation the ground may be marked, furrowed, and fertilized, the seed deposited in drills or sown broadcast, and the soil finally pressed or rolled firmly in a manner to leave the ground in perfect condition for crop growth and for the taking up of moisture and for irrigation purposes, which latter result renders the machine particularly effective in arid districts.

Further and subordinate objects of the invention will hereinafter appear as the necessity for their accomplishment is developed in the succeeding description when taken in connection with the accompanying drawings, in which I have illustrated a preferred form of my invention.

In said drawings, Figure 1 is a side elevation of the machine complete, but showing the front end of the tongue broken away. Fig. 2 is a sectional view on the line 2 2 of Fig. 1. Fig. 3 is a top plan view of the subject-matter of Fig. 1, but showing the seed and fertilizer hoppers removed; and Fig. 4 is a detail sectional view, partly in elevation, illustrating the construction and mounting of the grain-tubes.

Referring to the numerals employed to designate corresponding parts throughout the views, 1 indicates the frame of my machine, which is of generally rectangular or oblong form and comprises the side frame-bars 2 and the front and rear end bars 3 and 4. The side bars or rails 2 are formed with pendent extensions 5, which carry bearing-boxes 6 for the reception of stationary shafts 7, upon which rotate independently a pair of rollers or rotary clod-crushers 8 and 9, provided with suitable boxings and preferably of slightly-different lengths. The two rollers constitute independent sections of what I shall term, broadly, in the claims a "roller" and "furrow-marker." The roller or roller-section 8 is provided with two furrow-flanges 10 and 11, and the roller 9 is provided with a similar flange 12, the flange 11 being located at the center of the machine and the flanges 10 and 12 being located, respectively, approximately midway between the flange 11 and the opposite sides of the frame. Under some conditions—as, for instance, where the machine is designed for use as a roller, without reference to the planting apparatus—it is desirable to effect the detachment of the several furrow-flanges, and for this reason I construct each flange of a pair of hinged semicircular sections designed to be clamped firmly, but detachably, upon the cylinders by clamping-bolts 13. The specific form of these flanges is not absolutely essential; but I prefer to form them with comparatively-wide bases in contact with the rollers and with narrow treads, as shown. In like manner the particular construction of the roller-sections is non-essential; but, as shown, I employ sheet-metal cylinders, properly braced at their ends by spokes radiating from the boxings, to which reference has been made.

A sufficient distance in advance of the roller I mount upon the frame a transverse distributing-board 14, provided adjacent to its front edge with a series of upwardly-flaring tube-sockets 15 and adjacent to its rear edge with a second series of tube-sockets 16, alternating with the adjacent sockets 15. The sockets 15 are designed for the reception of the upper ends of grain-tubes 17, at the lower ends of which are mounted the drill shoes or points 18, connected to the rear ends of drag-bars 19, depending from and connected to the under side of the frame at points in advance of the distributing-board. The sockets 16 are somewhat less in number than the sockets 15 and are located directly in front of the treads of the several furrow-flanges and are designed for the reception of the upper ends of grain-tubes 20, carrying plows or furrow-openers 21 at their lower ends, which latter, like the drill-shoes 18, are connected to and braced by drag-bars 22, depending from the frame.

At proper distances above the drill-shoes and plows 18 and 21 the tubes 17 and 20 are provided with gate-valves 23 and 24, normally retained in their open positions, as indicated in Fig. 4, for the purpose of directing the grain through openings 25, provided in the tube for the purpose of permitting the grain to be sown broadcast, unless drilling is desired, in which event the valves are swung to their closed positions, which permits the grain to gravitate through the tubes to the ground. In order to yieldingly urge the tubes toward the ground, I provide spiral or other springs 26, encircling the tubes adjacent to their upper ends and bearing at their opposite extremities against the under side of the distributing-table and against the bands 27 of longitudinal keeper-loops 28, provided upon each of the tubes for the reception of horizontal regulating-bars 29, 30, and 31. These last-named bars are designed to limit the downward movement of the grain-tubes under the impulse of the springs 26, the bars 29 and 30 performing this function for the series of tubes 17 at the opposite sides of the center of the frame and the bar 31 performing a like function in connection with the several tubes 20, to which the furrow-openers or plows are connected.

It is obviously necessary to permit different degrees of depression of the bars under varying conditions of use, and for this reason I have provided regulating means for effecting the raising and lowering of the regulating-bars to accommodate such conditions. This means comprehends a series of shafts or drum-shafts 32, 33, and 34, journaled in suitable bearings above the frame, as indicated in the drawings, and each provided with terminal sprockets 35, 36, and 37, to which are connected chains 38, supporting at their lower ends the several regulating-bars. The grain-tubes are thus divided into three series, each of which is regulated by the rotation of an independent drum-shaft.

The operating means for the regulating mechanism comprehends a pair of crank-shafts 39 and 40, geared at their front ends to the shafts 32 and 33—as, for instance, by worm-gearing—as shown, and provided at their opposite ends with cranks 41, located beyond the rear end of the machine-frame and adjacent to the driver's seat 42, whereby the driver or operator may effect the prompt regulation of either series of grain-tubes 17 at either side of the machine. The drum-shaft 34, controlling the regulation of the tubes 20, carrying the openers, requires frequent regulation, and for this reason it is geared to a knuckle-shaft 43, located at the longitudinal center of the frame and provided with an operating-wheel 44 immediately in front of the seat. It will now be seen that by the manipulation of the cranks 41 or the operating-wheel 44 the limit of depression of the drill-shoes and furrow-openers may be regulated at will without interfering with the individual yielding of said elements in the event of their encountering an obstruction—as, for instance, a stone or root.

Above the distributing-board 14 is mounted the usual seed-hopper 45, extending across the frame, as shown in Fig. 2, and supported upon suitable brackets 46, carried by the frame, in proper position to cause the grain or seeds to be discharged into the tube-sockets and thence into the grain-tubes for planting either through the drills or through the broadcast openings 25. Any ordinary form of feed mechanism (which I have not deemed it necessary to illustrate) is located within the hopper 45 and is operated from the roller by appropriate gearing—as, for instance, sprocket-wheels 47, carried at the outer end of each roller 8, and sprocket-chains 48 passed around it and around smaller sprocket-wheels 49, carried upon one of the feed-shafts.

In advance of the seed-hopper I have mounted a transverse fertilizer-box 50, which is also provided with an ordinary form of feed, geared, as by a suitable gearing 51, to the feed of the seed-hopper.

52 indicates the usual steering-wheel, journaled in the steering-frame 53, depending from the tongue immediately in front of the frame and designed to facilitate the transportation of the machine.

In use the operation of my device is as follows: The drill-tubes having been properly adjusted by the elevation and depression of the regulating-bars, the machine is drawn over the ground and motion is communicated from the roller to the feed mechanisms of the seed-hopper and fertilizer-box. The fertilizer will be distributed upon the ground in advance of the drills which will deposit the seeds. As the machine advances the furrow-opening plows will mark out furrows, which will be rolled and pressed by the subsequent passage of the roller, whose flanges will be presented directly in the furrows and will pack the soil therein in a manner to form excellent drains, of vast utility in arid districts where irrigation of the soil is necessary. If under various conditions of use—as, for instance, in hillside work or the like—it is necessary to regulate the depression of either or all of the series of grain-tubes, the desired result may be accomplished by the proper manipulation of the operating-cranks and wheel, and if it should be desired to employ the roller simply as a clod presser or packer the flanges may be quickly removed by releasing the bolts and swinging the hinged flange-sections clear.

From the foregoing it will appear that I have produced a simple, durable, and highly-effective agricultural machine embodying a construction best calculated to effect the accomplishment of the several objects stated;

but while the present embodiment of my invention appears at this time to be preferable, I desire to reserve the right to effect such structural changes, modifications, and variations as may be properly comprehended within the scope of the protection prayed.

What I claim is—

1. In a machine of the character described, the combination with a frame and a flanged roller, of grain-tubes depending from the roller directly in advance of the flanges thereof and provided with plows, extended below the roller and other grain-tubes located intermediate of the flanges and out of line with the first-named tubes and provided with drill-shoes likewise extended below the roller.

2. In a machine of the character described, the combination with a frame, a roller, and a series of vertically-movable tubes, springs encircling the tubes and bearing against the frame to urge said tubes downwardly, a regulating-bar disposed to limit the depression of the tubes, and means located above the frame for raising and lowering the bar.

3. In a machine of the character described, the combination with a frame and roller, of a series of grain-tubes provided with guide-loops located intermediate of the ends of the tubes, a spring encircling each tube and bearing against the frame and loop respectively, a regulating-bar passed through the several loops, and operating means for the regulating-bar, said means being located above the frame.

4. In a machine of the character described, the combination with a frame and roller, of a plurality of spring-pressed grain-tubes depending from the frame in advance of the roller, a guide-loop carried by each tube, a regulating-bar passed through the loops of the several tubes, a drum-shaft mounted above the frame, a flexible piece connected to the regulating-bar and drum-shaft, respectively, and means for rotating the drum-shaft to effect the elevation of the regulating-bar and the adjustable limitation of the depression of the several grain-tubes without interfering with their individual yielding when opposed by an unusual obstruction.

5. In a machine of the character described, the combination with a frame and roller, of a distributing-board mounted upon the frame and provided with a plurality of tube-sockets, vertically-adjustable grain-tubes having their upper ends received within the sockets, means for yieldingly supporting the tubes, and a seed-hopper located above the distributing-board to deposit the seeds within the several sockets for delivery through the grain-tubes.

6. In a machine of the character described, the combination with a frame and roller, of a distributing-board mounted upon the frame and provided with a plurality of tube-sockets, vertically-adjustable grain-tubes having their upper ends received and guided within the sockets, guide-loops laterally offset from the tubes between the ends thereof, springs encircling the tubes and bearing at their opposite ends against the frame and guide-loops respectively, a regulating-bar extending through the loops of the grain-tubes, and means located at the extreme rear end of the frame for elevating and depressing the regulating-bar to determine the maximum depression of the grain-tubes.

7. A grain-tube for machines of the character described provided with a broadcast-opening in its wall, a gate-valve hinged at its center at the lower edge of said opening, and a spring disposed between the tube and the exterior end of the gate-valve to normally retain the interior end of said valve in an obstructed position across the tube.

In testimony that I claim the foregoing as my own I have hereto affixed my signature in the presence of two witnesses.

DAVID KING UDALL.

Witnesses:
STELLA JARVIS,
MARY CHENEY.